Sept. 6, 1966  S. WAY  3,271,597
MAGNETOHYDRODYNAMIC GENERATING DUCT
Filed Aug. 22, 1963
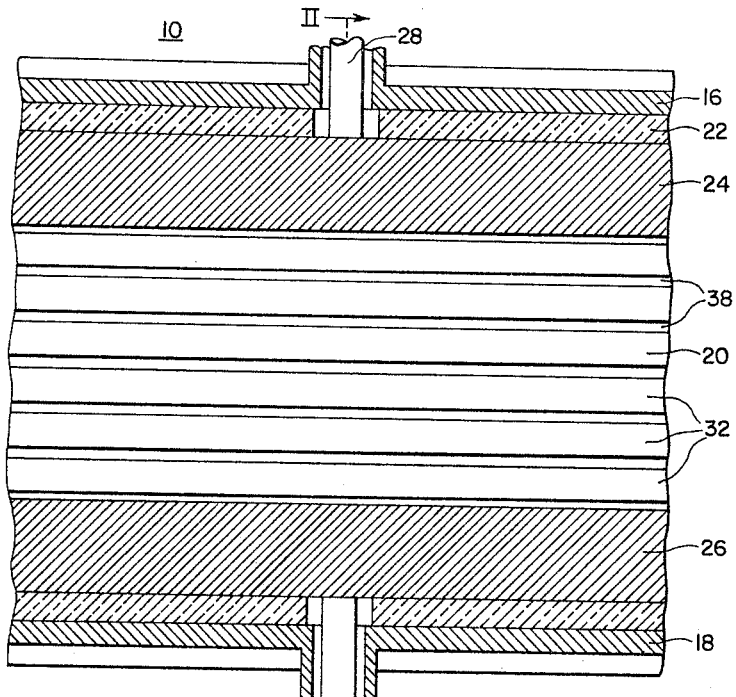
Fig.1.
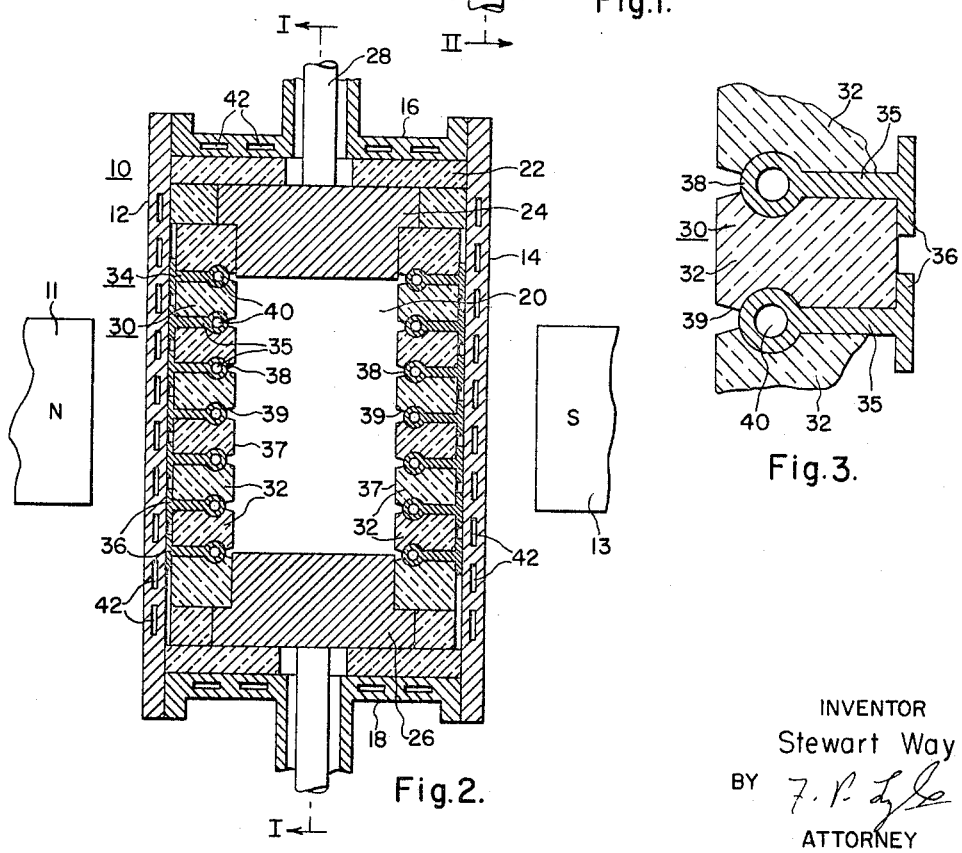
Fig.2.
Fig.3.
INVENTOR
Stewart Way
BY  F. P. Lyle
ATTORNEY

United States Patent Office 3,271,597
Patented Sept. 6, 1966

3,271,597
MAGNETOHYDRODYNAMIC
GENERATING DUCT
Stewart Way, Churchill Boro, Pa., assignor to Westinghouse Electric Corporation, East Pittsburgh, Pa., a corporation of Pennsylvania
Filed Aug. 22, 1963, Ser. No. 303,965
6 Claims. (Cl. 310—11)

The present invention relates to magnetohydrodynamic generating systems and more particularly to generating duct arrangements therefor.

According to magnetohydrodynamic (hereinafter referred to as MHD) theory, an electric voltage is generated between electrodes on spaced walls of a duct along which a conductive fluid or ionized gas is transported and in which a magnetic field is established transversely of both the interelectrode direction and the flow direction of the fluid. This theory is a special case of the more general electromagnetic induction theory of Faraday according to which an electromotive force or voltage is induced in an electric circuit whenever the magnetic flux linking the circuit changes. As is well known in electromechanical machines, the Faraday theory accounts for voltage generation in copper or other solid conductors with which flux linkages continually undergo change by movement of the conductors through a magnetic flux field or by movement of a magnetic flux field across the conductors.

In an MHD system, a flowing conductive fluid or ionized gas is given the role of a conductor or conducting medium undergoing motion through a magnetic flux field, and an electric field and a corresponding voltage are produced across the moving fluid in a direction determined by well known directional rules of electromagnetic induction. Such induced voltage appears across the aforementioned electrodes between which the fluid is channeled, and when a load circuit is connected across the electrodes current is generated and circulated through the completed circuit.

Further considerations provide an elaboration of MHD theory so that the generated voltage and other operational characteristics obtained from a given generating system can be predicted with a reasonable degree of certainty. For example, if ionized gas is used as the conductive working fluid, generated voltage and current are dependent upon physical parameters (including electric conductivity, temperature, pressure and velocity) of the gas (which can comprise combustion products as well as seed atoms or molecules of a low ionization potential element such as cesium or potassium) and the manner in which such parameters dynamically undergo change particularly as the gas flows through the generating duct arrangement. The magnetix flux field and the physical properties of structural materials such as magnetic permeability, electrical resistivity or conductivity and temperature-strength characteristics are also significant factors in voltage and current determination. More comprehensively, the operational nature of an MHD generating system is susceptible to mathematical analysis, and such analysis in terms of flow, electromagnetic and thermodynamic principles is available in recent research and patent literature, with reference particularly being given to a copending application Serial No. 202,714 entitled "Magnetohydrodynamic Generator Apparatus," filed by Stewart Way on June 15, 1962 and assigned to the present assignee.

One approach to duct structurization is that in which the duct is elongated and provided with a rectangular or square or similar cross section. Electrodes are disposed on two of the opposing elongated duct walls and a voltage is generated between such electrodes when magnetic flux is established transversely of the interelectrode direction and the duct longitudinal direction and when a conductive fluid or ionized gas is transported longitudinally through the duct. Spaced insulative sidewalls connect the electrode bearing walls longitudinally thereof. The magnetic flux can be produced with acceptable uniformity along the duct by means of a magnet winding disposed longitudinally of the duct and surrounded along its length by laminated magnet iron so as to minimize the magetomotive force required to establish the desired level of flux in the duct.

In terms of physical operation, voltage generating efficiency of the duct is limited by the extent to which sidewall electrical resistivity can be maintained with rising temperature, since interelectrode leakage conduction (and generated Hall currents) through the sidewalls produces an internal generator power loss. Although the duct and magnet structure disclosed in a copending application, entitled "Magnetohydrodynamic Generating System," by W. Brenner, Serial No. 318,260, filed October 23, 1963, and assigned to the present assignee, avoids costly flux producing structure of the type just described and further avoids the problem of sidewall leakage through the elimination of sidewall structure, there are nevertheless applications in which sidewall duct and surrounding magnet structure is advantageous or desirable. Where sidewall duct structure is preferred, generating efficiency is thus promoted if sidewall leakage currents are optimally minimized or substantially eliminated.

In a copending application entitled "Gaseous Insulation for Magnetohydrodynamic Energy Conversion Apparatus," Serial No. 210,408 filed by W. S. Emmerich on July 17, 1962 and assigned to the present assignee, sidewall conductivity is controlled through the introduction or utilization of relatively cool gas between the sidewalls and the high temperature working fluid. A layer of such insulative gas can be provided by an injection process or to some extent by the provision of a positive coolant system in the sidewall which tends to maintain a layer of gas adjacent thereto at a lower temperature than that of the rest of the working fluid in the generating duct. In a number of applications, both of these approaches to the problem can be inadequate since sidewall temperature nevertheless reaches at a level at which sidewall leakage currents substantially impair generator efficiency.

In accordance with the present invention, a generating duct for an MHD generating system comprises elongated and spaced electrode bearing walls with elongated and spaced sidewalls connecting the electrode walls longitudinally thereof. Preferably, the electrode walls are uniformly spaced from each other along their length, and each of the sidewalls is provided with thermal insulating means which face the flow channel and which are divided into sections by current barrier means through which coolant is preferably circulated. Such current barrier means thus substantially impede the flow of sidewall leakage current between the electrode walls.

Accordingly, it is an object of the invention to provide a novel generating duct for an MHD generating system so as to provide efficiency and economy in power generation.

Another object of the invention is to provide a novel generating duct for an MHD generating system wherein sidewall leakage current between the duct electrodes is substantially impeded.

A further object of the invention is to provide a novel generating duct for an MHD generating system wherein thermal insulating means are efficiently supported on sidewalls of the duct while sidewalls leakage current between the duct electrodes is substantially impeded.

These and other objects of the invention will become more apparent upon consideration of the following detailed description along with the attached drawing, in which:

FIGURE 1 shows a longitudinal section of a generating duct for an MHD generating system constructed in accordance with the principles of the invention;

FIG. 2 shows a cross section of the duct shown in FIG. 1 and is taken along the reference line II—II thereof; and FIG. 3 shows an enlarged view of a portion of a cross section through one of the side walls of the generating duct of FIG. 1.

More specifically, there is shown in FIGS. 1 and 2 an elongated generating duct 10 for an MHD generating system, and the duct 10 is provided with elongated sidewalls 12 and 14 and electrode bearing walls 16 and 18 which in combination enclose a flow channel 20 along which working fluid or ionized gas is transported. Flux producing means or magnet structure diagrammatically illustrated by magnet poles 11 and 13 can be suitably disposed about the duct 10, for example with elongated magnetizing windings extending longitudinally of the duct 10, outwardly of the electrode bearing walls 16 and 18, so as to produce flux directed between the side walls 12 and 14. Such magnetic flux is thus transverse to the interelectrode direction as well as the fluid flow direction.

Generally, duct arrangements other than the one which is shown can be arranged in accordance with the principles of the invention, and as one example of another duct arrangement reference is made to a copending application, entitled "Magnetohydrodynamic Generating System," filed by W. Brenner and I. Tuba on October 21, 1963, Serial No. 317,671 and assigned to the present assignee, wherein there is shown a duct arrangement having multiple counter flow channels. In the same application there is shown magnet structure generally of the type previously described herein.

If the conductive working fluid or ionized gas is formed by combustion products, the MHD system in which the generating duct 10 is employed can for example comprise an air intake compressor (not shown) from which pressurized air is transported to a combustion chamber (not shown) where it is modified in its makeup by the products of combustion and where the resulting gaseous mixture is heated to a relatively high temperature, for example 2500° Kelvin. Highly ionizable seed atoms or molecules, such as those of cesium or potassium, can be injected into the gas by suitable means (not shown) so as to improve current generating performance in the duct 10, and such seed atoms or molecules can subsequently be substantially reclaimed from the gas stream by suitable means.

Heat exchange apparatus (not shown) can be provided in the MHD system where such is needed for the purpose of heat recovery from circulated coolants or for other purposes. A separate power source (not shown) can be provided to energize the magnets associated with the duct 10. Other apparatus serving various cooperative or incidental system functions can be employed depending upon the functional needs of a particular MHD system.

The electrode bearing walls 16 and 18 can be formed from a suitable structural material such as stainless steel and are preferably lined with a layer 22 of thermal insulating material such as magnesia or strontium zirconate which has high temperature-strength characteristics and relatively high resistivity at elevated temperatures. Further, an electrode layer 24 or 26 is disposed on each of the thermally insulative layers 22, and the electrodes 24 and 26 are preferably uniformly spaced from each other along their length for uniformity in voltage generation. This is because generated voltage is given by the following relationship in which certain simplifying assumptions are made:

$$V = uBd$$

where:

$u$ = Conductive fluid velocity
$B$ = Channel flux density
$d$ = Distance between duct electrodes However, the sidewalls 12 and 14 can if desired be increased in separation along their length so as to provide an expanding flow cross-section for fluid velocity maintainence as fluid pressure drops due to work performed against the opposing force of the magnetic field.

The electrode layers 24 and 26 can be formed as unitary members from a material such as zirconium boride or they can be formed from a plurality of electrode members (not shown) and insulative spacer members (not shown) arranged in alternate order along the length of the duct 10. In either event, the electrode layers 24 and 26 are suitably supported in place and one or more terminals 28 are connected to each electrode layer 24 or 26 and extended outwardly through the adjacent thermally insulative layer 22 and walls 16 or 18 to the exterior where suitable load circuit connections can be made.

Each of the sidewalls 12 or 14 is provided with a thermally insulative liner 30 (of suitable material such as zirconia) which is segregated or divided into elongated layers 32 over the lateral dimension or height of the sidewall 12 or 14. Separation of the thermally insulative layers 32 is provided by current barrier means 34 which comprise in this instance a plurality of elongated plate members 35 formed from a material such as copper extending along the sidewall 12 or 14 and having one side portion 36 thereof suitably secured to the adjacent sidewall 12 or 14 such as by welding.

Each of the plate members 35 projects laterally inwardly of the duct 10 so that a free side portion 38 thereof is exposed to the flow channel 20, and one or more flow passages 40 are provided in each plate or plate side portion 38 for coolant circulation. The sidewalls 12 and 14 and the electrode bearing walls 16 and 18 are also preferably cooled, for example through passages 42 incorporated therein and the passages 42 can form a portion of a coolant system (not shown) associated with the plate member coolant passages 40 or they can be incorporated in a separate coolant system.

Each of the thermally insulative layers 32 is thus disposed between adjacent plate members 35 and accordingly separated from each other along the lateral or vertical dimension of the sidewall 12 or 14. Efficient support for the thermally insulative liner 30 is also provided since each of the thermally insulative layers 32 is individually supported against movement away from the sidewall 12 or 14 into the flow channel 20. Preferably, each layer 32 extends slightly beyond adjacent plates 35 as indicated by the reference character 37, but, if so extended, it is then preferably sloped inwardly, as indicated by the reference character 39 to the adjacent plate side portion 38 so that layer separation is assured.

As can clearly be observed in FIG. 2, generated current I flowing between the electrode layers 24 and 26 can be shorted through the sidewall structure unless sufficient current impedance is incorporated therein. High temperature ceramics can be acceptably effective in preventing such leakage current, but, with increasing temperature, the conductivity of such ceramics including zirconia tends to increase and accordingly sidewall leakage currents also tend to increase unless sidewall resistivity is maintained by other means at elevated temperatures. In the duct 10, however, sidewall leakage currents are effectively blocked by the current barrier means 34 or plate members 35 because the fluid or heater cooling in passages 38 produces a cool surface layer of ceramic adjacent to the plate members 35 and the electrical resistance of this cool ceramic face is thereby relatively high and current flow is thus impeded.

In other applications of the invention, the current barrier means 34 or plate members 35 can be provided with forms other than that shown illustratively herein so long as sidewall lining means are effectively separated into two or more layers. Further, the current barrier means 34 can be incorporated in any generating duct wall extending between electrode bearing walls and need not be limited to duct boundary sidewalls such as the sidewalls 12 and 14. For example, the current barrier means 34 can be incorporated in partition walls where such are provided to divide a generating duct arrangement into a plurality of elongated flow channels as shown in the aforementioned Brenner application. The barrier means 34 could also be disposed transversely to prevent current leakage in the axial direction as a result of the so called Hall voltage.

In operation, the generating duct 10 efficiently and economically generates power between the electrode layers 24 and 26 when it is incorporated in an MHD generating system in which suitable means are provided for supplying and transporting a conductive fluid or ionized gas through the duct channel 20 (such as the aforementioned combustion chamber and suitable interconnecting flow channels) and in which magnet structure, of the type previously described for example, produces transverse magnetic flux between the sidewalls 12 and 14. Efficiency is obtained particularly since comparatively higher temperature operation is enabled by the fact that leakage current through the sidewall structure is substantially blocked and internal generating losses are thus substantially decreased.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. An elongated generating duct for a magnetohydrodynamic generating system, said duct comprising spaced elongated electrode bearing walls and at least one elongated wall disposed between said electrode bearing walls along the length thereof, said walls cooperatively enclosing at least one elongated channel for flow of conductive fluid therethrough, elongated current barrier means supported on said one wall and including a plurality of elongated members spaced from each other and disposed in a reference plane including the interelectrode direction and the duct longitudinal direction, said elongated members extending in one of said directions and projecting laterally inwardly of said one wall into the space between said electrode bearing walls, and thermally insulative means disposed adjacent said one wall for forming a major inner refractory surface adjacent the elongated channel and conductive fluid and divided into a plurality of electrically separate layers respectively separated by said elongated current barrier members so that current therethrough is substantially impeded at elevated operating temperatures.

2. An elongated generating duct for a magnetohydrodynamic generating system, said duct comprising spaced elongated electrode bearing walls and at least one elongated wall disposed between said electrode bearing walls along the length thereof, said walls cooperatively enclosing at least one elongated channel for flow of conductive fluid therethrough, elongated current barrier means supported on said one wall and including a plurality of elongated members spaced from each other in the interelectrode direction and extending longitudinally of said duct and projecting laterally inwardly of said one wall into the space between said electrode bearing walls, thermally insulative means disposed adjacent said one wall for forming a major inner refractory surface adjacent the elongated channel and conductive fluid and divided into a plurality of electrically separate elongated layers respectively separated by said elongated current barrier members so that interelectrode leakage current therethrough is substantially impeded at elevated operating temperatures, and means for circulating coolant through at least an inmost elongated portion of each of said laterally inwardly projecting members.

3. An elongated generating duct for a magnetohydrodynamic generating system, said duct comprising spaced elongated electrode bearing walls and at least one elongated wall disposed between said electrode bearing walls along the length thereof, said walls cooperatively enclosing at least one elongated channel for flow of conductive fluid therethrough, a plurality of elongated current barrier members extending longitudinally of said duct and spaced from each other in the interelectrode direction and projecting laterally inwardly of said one wall into the space between said electrode bearing walls, each of said members secured to said one wall, thermally insulative means disposed adjacent said one wall for forming a major inner refractory surface adjacent the elongated channel and conductive fluid and divided into a plurality of electrically separate elongated layers supported respectively by said elongated current barrier members so that interelectrode leakage current therethrough is substantially impeded at elevated operating temperatures, and means for circulating coolant through at least an inmost elongated portion of each of said current barrier members.

4. An elongated generating duct for a magnetohydrodynamic generating system, said duct comprising spaced elongated electrode bearing walls and at least a pair of elongated sidewalls disposed in spaced relation between said electrode bearing walls and along the length thereof, said walls enclosing at least one elongated channel for flow of conductive fluid therethrough, elongated current barrier means supported on each of said sidewalls and including a plurality of elongated members extending longitudinally of said duct and spaced from each other in the interelectrode direction and projecting laterally inwardly of said one wall into the space between said electrode bearing walls, and thermally insulative means disposed adjacent each of said sidewalls for forming a pair of major inner refractory surfaces adjacent the elongated channel and conductive fluid and divided into a plurality of electrically separate elongated layers supported respectively by said elongated current barrier members so that interelectrode leakage current therethrough is substantially impeded at elevated operating temperatures.

5. An elongated generating duct for a magnetohydrodynamic generating system, said duct comprising spaced elongated electrode bearing walls and at least one pair of elongated sidewalls disposed in spaced relation between said electrode bearing walls along the length thereof, said walls cooperatively enclosing at least one elongated channel for flow of conductive fluid therethrough, a plurality of elongated current barrier members associated with each of said sidewalls and extending longitudinally of said duct and spaced from each other in the interelectrode direction and projecting laterally inwardly of said one wall into the space between said electrode bearing walls, each of said current barrier members secured to its associated sidewall, and thermally insulative means disposed adjacent each of said sidewalls for forming a pair of major inner refractory surfaces adjacent the elongated channel and conductive fluid and divided into a plurality of electrically separated elongated layers supported respectively by the associated elongated current barrier members so that interelectrode leakage current therethrough is substantially impeded at elevated operating temperatures.

6. An elongated generating duct for a magnetohydrodynamic generating system, said duct comprising spaced elongated electrode bearing walls and at least one pair of elongated sidewalls disposed in spaced relation between said electrode bearing walls along the length thereof, said walls cooperatively enclosing at least one elongated channel for flow of conductive fluid therethrough, a plurality of elongated current barrier members associated with each of said sidewalls and extending longitudinally of said duct and spaced from each other in the interelectrode direction and projecting laterally inwardly of said one wall into the space between said electrode bearing walls, each of said current barrier members secured to its associated sidewall, thermally insulative means disposed adjacent each of said sidewalls for forming a pair of major inner refractory surfaces adjacent the elongated channel and conductive fluid and divided into a plurality of electrically separated elongated layers supported respectively by said elongated current barrier members so that interelectrode leakage current therethrough is substantially impeded at elevated operating temperatures, each of said thermally insulative layers extending inwardly of the space between said electrode bearing walls to an extent greater than that of said current barrier members, the channel facing surface of each of said thermally insulative layers sloped toward its associated sidewall and each adjacent current barrier member so that an inmost elongated portion of each of said current barrier members is freely exposed to said channel, and means for circulating a coolant through at least said inmost elongated portion of each of said current barrier members.

References Cited by the Examiner

UNITED STATES PATENTS 3,178,596   4/1965   Brogan _____ 310—11

MILTON O. HIRSHFIELD, *Primary Examiner.*

DAVID X. SLINEY, *Examiner.*